US010340810B2

(12) United States Patent
Achtzehn et al.

(10) Patent No.: US 10,340,810 B2
(45) Date of Patent: Jul. 2, 2019

(54) BIDIRECTIONAL DC CONVERTER ASSEMBLY HAVING CASCADE OF ISOLATED RESONANT CONVERTER AND STEP-UP/STEP-DOWN CONVERTER

(71) Applicant: Leopold Kostal GmbH & Co. KG, Luedenscheid (DE)

(72) Inventors: Patrick Achtzehn, Schermbeck (DE); Jan Korte, Werne (DE); Jens Czichon, Dortmund (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 0 days.

(21) Appl. No.: 16/199,692

(22) Filed: Nov. 26, 2018

(65) Prior Publication Data
US 2019/0097543 A1 Mar. 28, 2019

Related U.S. Application Data

(63) Continuation of application No. PCT/EP2017/062519, filed on May 24, 2017.

(30) Foreign Application Priority Data

May 25, 2016 (DE) .................. 10 2016 006 549

(51) Int. Cl.
*H02M 3/18* (2006.01)
*H02M 3/335* (2006.01)
(Continued)

(52) U.S. Cl.
CPC ....... *H02M 3/33584* (2013.01); *H02M 3/158* (2013.01); *H02M 3/1582* (2013.01);
(Continued)

(58) Field of Classification Search
CPC .. H02M 3/33584; H02M 3/1582; H02M 3/18; H02M 7/66; H02M 7/72;
(Continued)

(56) References Cited

U.S. PATENT DOCUMENTS

| 7,145,786 B2 | 12/2006 | Vinciarelli |
| 2007/0216391 A1 | 9/2007 | Blanken |

(Continued)

FOREIGN PATENT DOCUMENTS

DE 102014016076 A1 8/2015

OTHER PUBLICATIONS

Yue Wen et al., Analysis and Comparison of Frequency Stabilization Loops in Self-Oscillating Current Mode DC Converters, IEEE Transactions on Power Electronics, Institute of Electrical and Electronics Engineers, USA, vol. 28, No. 10, Oct. 1, 2013, pp. 4753-4766.

(Continued)

*Primary Examiner* — Yusef A Ahmed
*Assistant Examiner* — Bryan R Perez
(74) *Attorney, Agent, or Firm* — Brooks Kushman P.C.

(57) ABSTRACT

A bidirectional DC converter assembly includes two serially-arranged DC/DC converters. The first converter is a buck (or a buck/boost) converter to be connected to a high-voltage (HV) level of an electric vehicle. The second converter is a series resonant switching converter to be connected to a low-voltage (LV) of the vehicle. The series resonant switching converter of the second converter is formed by a DC/AC converter, a transformer, and an AC/DC converter, which are serially arranged in the stated order between the first converter and the LV level. A bidirectional peak current controller is associated with the first converter. The peak current controller is realized by a current measurement at an inductor of the first converter. The peak (Continued)

current controller uses the coil current value, which is modified with an offset value and thus has a constant sign, as a set point in controlling the first converter.

2 Claims, 3 Drawing Sheets

(51) Int. Cl.
    *H02M 3/158*      (2006.01)
    *H02M 3/337*      (2006.01)
    *H02M 7/757*      (2006.01)
    *H02M 1/00*      (2006.01)

(52) U.S. Cl.
    CPC ........... *H02M 3/18* (2013.01); *H02M 3/3378* (2013.01); *H02M 7/757* (2013.01); *H02M 2001/007* (2013.01); *H02M 2001/0025* (2013.01)

(58) Field of Classification Search
    CPC ........ H02M 7/68; H02M 7/753; H02M 7/757; H02M 7/758; H02M 7/793; H02M 7/79; H02M 3/3378; H02M 3/158; H02M 2001/007; H02M 2001/0025
    See application file for complete search history.

(56) References Cited

U.S. PATENT DOCUMENTS

| | | | | |
|---|---|---|---|---|
| 2013/0106342 A1* | 5/2013 | Iwata | ...................... | H02M 7/30 320/101 |
| 2014/0121787 A1* | 5/2014 | Yamazaki | ........... | H04L 12/2825 700/19 |
| 2015/0349649 A1* | 12/2015 | Zane | ................. | H02M 3/33507 363/21.03 |

OTHER PUBLICATIONS

European Patent Office, International Search Report for International Application No. PCT/EP2017/062519, dated Aug. 17, 2017.
German Patent and Trademark Office, German Search Report for corresponding German Patent Application No. 10 2016 006 549.4 dated Aug. 7, 2017.

* cited by examiner

BIDIRECTIONAL DC CONVERTER ASSEMBLY HAVING CASCADE OF ISOLATED RESONANT CONVERTER AND STEP-UP/STEP-DOWN CONVERTER

CROSS-REFERENCE TO RELATED APPLICATIONS

This application is a continuation of International Application No. PCT/EP2017/062519, published in German, with an International filing date of May 24, 2017, which claims priority to DE 10 2016 006 549.4, filed May 25, 2016; the disclosures of which are hereby incorporated in their entirety by reference herein.

TECHNICAL FIELD

The present invention relates to a bidirectional converter assembly for an electric vehicle having high and low voltage levels. The converter assembly includes a series circuit of two DC/DC converters. One DC/DC converter is a series resonant switching converter having a transformer. The other DC/DC converter is a buck or a buck/boost converter.

BACKGROUND

DE 10 2014 016 076 A1 describes such a DC/DC converter assembly. The converter assembly transforms the voltage of a high-voltage (HV) battery to the level of a low-voltage (LV) battery in an electric or hybrid vehicle. The converter assembly also allows energy flow in the opposite direction from the LV battery to the HV battery.

The converter assembly includes first and second DC/DC converters. The first DC/DC converter is a series resonant switching converter. The series resonant switching converter is connected to the HV voltage level and is operated with fixed clocking. The series resonant switching converter thus has a fixed transmission ratio and generates a relatively low (i.e., intermediate) DC link voltage at its output. The voltage of the HV battery can vary. Due to the fixed transmission ratio, the DC link voltage varies when the voltage of the HV battery varies.

The second DC/DC converter receives the DC link voltage. The second DC/DC converter is a buck/boost converter. The buck/boost converter has a variable voltage ratio to the fixed voltage level of the LV battery.

On the LV level, in addition to loads that cannot be regenerated, such as an electric heater, there are loads such as electrical machines (motor/generator) which during load changes are capable of regenerative feedback. When these load changes happen dynamically, a large amount of energy is transferred back in a short time ($\Delta E=P*\Delta t$). The greater the amount of energy $\Delta E$ and the shorter the time $\Delta t$, the higher the power P in the peak.

To catch such dynamic peaks, so-called super or ultra-capacitors are installed as an output capacitor on the LV level. A super or ultra-capacitor stores an amount of energy $\Delta E=\frac{1}{2}*C*\Delta U^2$, where C is the capacitance of the capacitor and $\Delta U$ is a change in voltage of the capacitor. To keep both the voltage rise speed and the voltage swing low, these output capacitors are designed with capacities of several Farad. The installation space for such capacitors is on the order of the size of a shoe box. In addition, high-capacitance capacitors are expensive.

SUMMARY

An object is a DC/DC converter assembly which in a simple and inexpensive manner allows a highly dynamic change of the energy flow direction and highly dynamic current changes, especially to be able to operate regenerative loads, without the use of a large buffer capacitor.

This object is achieved in that the DC/DC converter assembly includes first and second DC/DC converters and a bidirectional peak current controller in which the first DC/DC converter is a buck converter (or a buck/boost converter) for connection to the high-voltage (HV) level of an electric vehicle and the second DC/DC converter is a series resonant switching converter for connection to the low-voltage (LV) level of the electric vehicle. The peak current controller regulates current by measuring current of an inductor coil of the buck converter. The peak current controller uses the inductor coil current measurement as a command variable which is modified by an offset value to have a constant (e.g., positive) sign.

The DC/DC converter assembly thus, to a certain extent, reverses the converter topology of DE 10 2014 016 076 A1. The DC/DC converter assembly has an advantage that currents in both converters can be kept small. Since high currents are generally associated with thermal losses, the total power loss can be limited and thus a high efficiency can be achieved.

The circuit manages with a relatively small capacitance energy storage since a control is used to control the switches of the DC/DC converters, which achieves very high dynamics and all load changes in one vehicle electrical system can respond without major voltage dips. The scheme thus makes it possible to keep the output capacitor small. In the case of the bidirectional DC/DC converter assembly proposed herein, a particularly high dynamic when changing the direction of energy flow is additionally achieved.

It is also advantageous that the use of output capacitors with small capacities in addition to a saving in installation space generally also allows a significant cost savings.

For the transmission of high electrical power between the HV level and the LV level, it is advantageous to embody the semiconductor switches of the DC/DC converters in silicon carbide or gallium nitride technology.

An embodiment provides a bidirectional DC converter assembly for an electric vehicle. The electric vehicle has a HV level and a LV level (e.g., high and low voltage buses). The DC converter assembly includes a series circuit of two DC/DC converters. The first DC/DC converter is a buck (or a buck/boost) converter. The buck converter is to be connected to the HV level. The second DC/DC converter is a series resonant switching converter having a transformer. The series resonant switching converter is to be connected to the LV level. A bidirectional peak current controller is associated with the buck converter. The peak current controller is realized by a current measurement at an inductor of the buck converter. The peak current controller uses the coil current value, which is modified with an offset value and thus has a constant sign, as a set point.

BRIEF DESCRIPTION OF THE DRAWINGS

The present invention is described below with reference to the drawings and explained in greater detail. In the drawings.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the FIGS., known electrotechnical components are only shown schematically and under schematic representation of their electrically formative components (particularly, converter switch and inductors).

Figure 2:
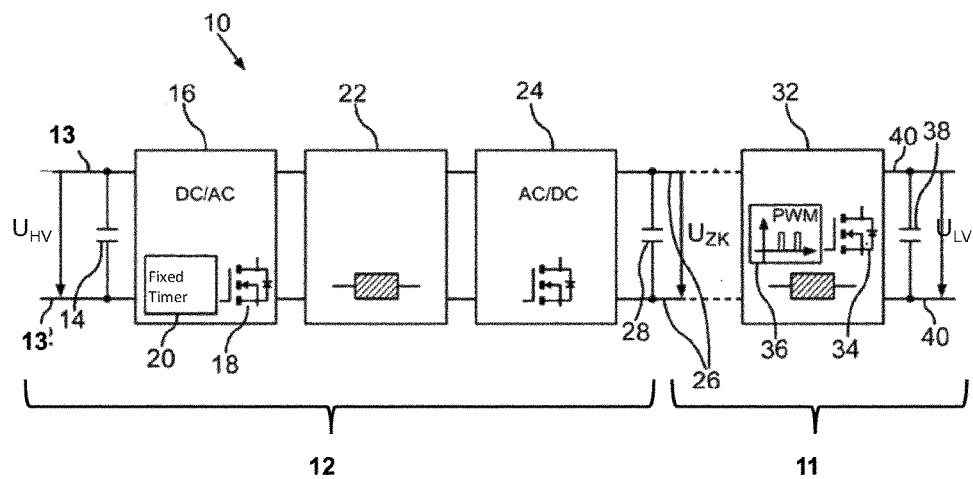
FIG. 2 illustrates a DC/DC converter assembly according to the Background Art, the DC/DC converter assembly according to the Background Art having a series resonant converter connected to a HV level and a buck converter connected to a LV level.

Referring initially to FIG. 2, a DC/DC converter assembly 10 according to the Background Art is shown. DC/DC converter assembly 10 is based on the disclosure of DE 10 2014 016 076 A1. DC/DC converter assembly 10 includes a first DC/DC converter 12 and a second DC/DC converter 11. First and second DC/DC converters 12 and 11 are serially arranged.

First DC/DC converter 12 is a series resonant converter connected to a high-voltage (HV) level of an electric vehicle via HV terminals 13. A HV battery (not shown) of the electric vehicle is connected to the HV level. The HV level has a HV DC voltage $U_{HV}$. A HV capacitor 14 is connected across HV terminals 13. HV capacitor 14 is used to stabilize against short term voltage fluctuations and to smooth the input voltage profile.

First DC/DC converter 12 on the HV side forms a galvanically isolating, series resonant switching converter. In this regard, first DC/DC converter 12 includes a HV DC/AC converter 16, a transformer 22, and a LV AC/DC converter 24, which are serially arranged.

HV terminals 13 are electrically coupled to the input of DC/AC converter 16. DC/AC converter 16 meets the requirements of converting the HV DC voltage $U_{HV}$ into an AC voltage. DC/AC converter 16 has one or more HV converter switches 18. Converter switch 18 is controlled to open and close to thereby convert (or also chop and polarity reversal) the DC voltage $U_{HV}$ into an alternating AC voltage. Converter switch 18 is shown schematically as a transistor. Converter switch 18 is driven in a clocked manner by a driver 20 associated with first DC/DC converter 12. Driver 20 applies voltage signals to the gate of the transistor of converter switch 18 to drive the converter switch. Driver 20 has a fixed duty cycle. This means that driver 20 is adapted to generate a predetermined voltage for a predetermined time to the gate of converter switch 18. An AC square wave is thereby outputted from the output of DC/AC converter 16.

Galvanically isolating transformer 22 is connected to the output of DC/AC converter 16. Transformer 22 converts the AC square wave into an AC voltage having a lower voltage value.

LV AC/DC converter 24 follows transformer 22. AC/DC converter 24 receives the lower value AC voltage from transformer 22. AC/DC converter 24 converts this AC voltage into an intermediate DC voltage $U_{ZK}$. AC/DC converter 24 outputs the intermediate circuit voltage $U_{ZK}$ across intermediate circuit connections 26.

A DC link capacitor 28 is connected across intermediate circuit connections 26. DC link capacitor 28 provides stabilization and smoothing of the intermediate voltage $U_{ZK}$ so that the intermediate voltage $U_{ZK}$ is a DC voltage or at least approximately a DC voltage.

By driving the gate of converter switch 18 of DC/AC converter 16 with a fixed duty cycle or by a fixed sampling rate, in combination with the transmission ratio of transformer 22 via DC/AC converter 16, transformer 22 and AC/DC converter 24 produce a fixed transmission ratio ü=$U_{ZK}/U_{HV}$. Thus, the ratio of the intermediate voltage $U_{ZK}$ to the HV DC voltage $U_{HV}$ is fixed. Consequently, all changes of the HV DC voltage $U_{HV}$ during operation, for example, by discharge or by changes in the load of the HV battery, lead to a corresponding change in the intermediate voltage $U_{ZK}$. This is not suitable for operation of electrical equipment that requires a certain fixed voltage.

Therefore, following DC link connections 26, is second DC/DC converter 11. Second DC/DC converter 11 is connected to a LV level of the electric vehicle via LV terminals 40. Second DC/DC converter 11 is a buck converter 32. Buck converter 32 is to output a LV DC voltage $U_{LV}$.

After transforming the HV DC voltage $U_{HV}$, whose voltage value can be up to 1,500 V, with a relatively high gear ratio to the variable DC link voltage $U_{ZK}$, which is less than or equal to 60 V, buck converter 32 is used for accurate adaptation of the intermediate voltage $U_{ZK}$ to the required LV DC voltage $U_{LV}$ of the LV level of the vehicle, the voltage level is also less than or equal to 60 V. Since the LV DC voltage $U_{LV}$ is usually 12 V or 48 V, the ratio between the intermediate voltage $U_{ZK}$ and LV DC voltage $U_{LV}$ is in the range of one to five.

Due to this low transmission ratio, it is possible to dispense with the use of a galvanically isolating transformer. As such, a converter module of the LV side of DC/DC converter 11 can therefore be designed in the form of a galvanically non-separate buck converter 32.

Buck converter 32 includes a driver 36 for driving LV converter switches 34 of buck converter 32. Driver 36 generates pulse width modulated (PWM) signals for driving LV converter switches 34. Driver 36 specifies PWM pulse lengths and pulse intervals for a suitable transmission ratio of buck converter 32. Thus, the variable intermediate DC link voltage $U_{ZK}$ is converted into a constant LV DC voltage $U_{LV}$. Buck converter 32 outputs the constant LV DC voltage $U_{LV}$ across LV terminals 40.

An output capacitor 38 is connected across LV terminals 40 to the output of buck converter 32. Output capacitor 38 likewise serves for voltage stabilization and voltage smoothing, so that the intended LV voltage $U_{LV}$ for the operation of the LV level is provided at LV terminals 40.

The operation direction of DC/DC converter assembly 10 is not limited to the forward operation; by a suitable control of DC/DC converters 11, 12, a reverse operation is possible, which transfers electrical energy from the LV level to the HV level.

As explained above, for intercepting dynamic load changes, DC/DC converter assembly 10 requires a relatively large output capacity 38. Such a relatively large output capacity 38 has a considerable space requirement and is costly.

These disadvantages are solved by a DC/DC converter assembly in accordance with embodiments of the present invention.

Figure 1:
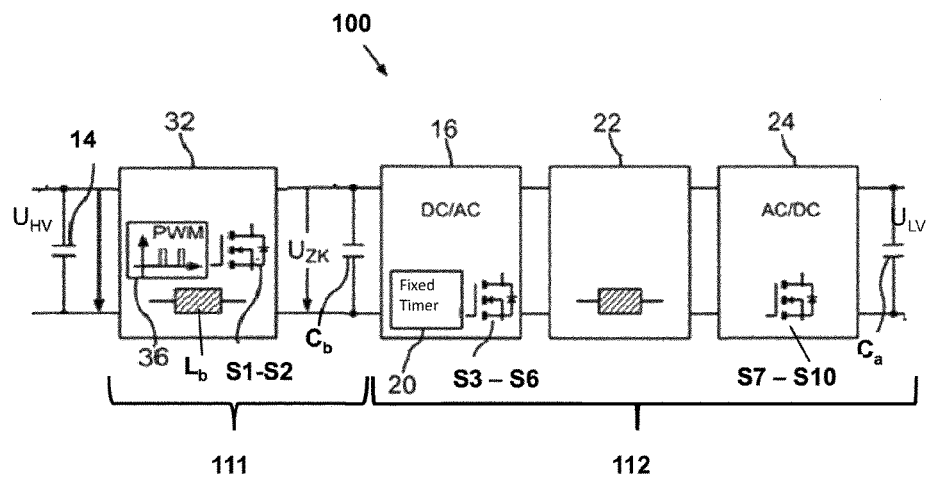
FIG. 1 illustrates a DC/DC converter assembly in accordance an embodiment of the present invention, the DC/DC converter assembly having a buck converter connected to a high-voltage (HV) level and a series resonant converter connected to a low-voltage (LV) level.

Referring now to FIG. 1, with continual reference to FIG. 2, a DC/DC converter assembly 100 in accordance an embodiment of the present invention is shown. DC/DC converter assembly 100 provides bidirectional power transmission between HV and LV levels of an electric vehicle. DC/DC converter assembly 100 includes a first DC/DC converter 111 and a second DC/DC converter 112. DC/DC converters 111 and 112 are serially arranged. First DC/DC converter 111 is a buck (or buck/boost converter) and is to be connected to the HV level. Second DC/DC converter 112 is a series resonant converter and is to be connected to the LV level. As such, although DC/DC converters 111 and 112 include the same or similar components as DC/DC converters 11 and 12 of DC/DC converter assembly 10 shown in FIG. 2, DC/DC converter assembly 100 has a significantly different circuit topology than DC/DC converter assembly 10. DC/DC converter assembly 100 thereby achieves benefits compared to DC/DC converter assembly 10 shown in FIG. 2.

Figure 3:
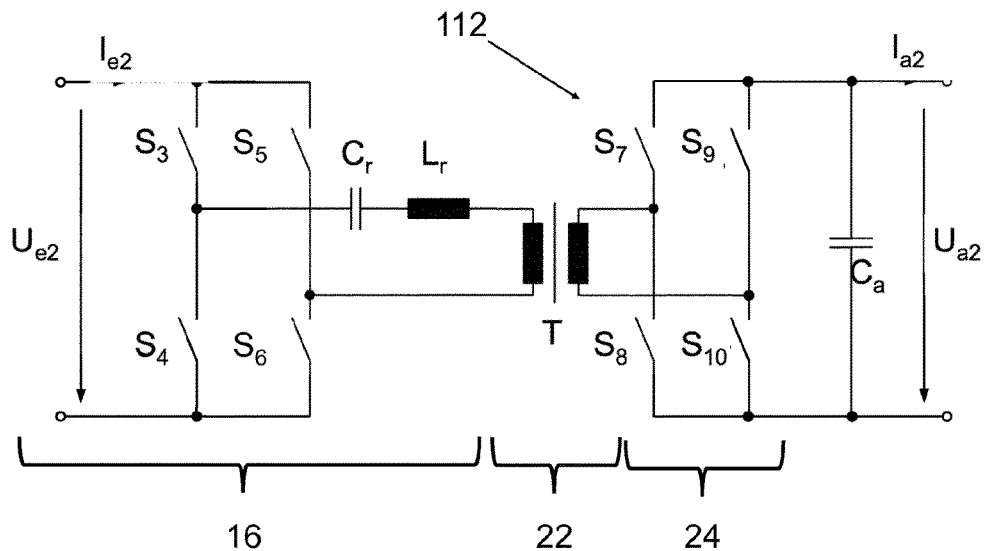
FIG. 3 illustrates a schematic circuit diagram of a series resonant converter of the DC/DC converter assembly in accordance with the embodiment of the present invention.
Figure 4:
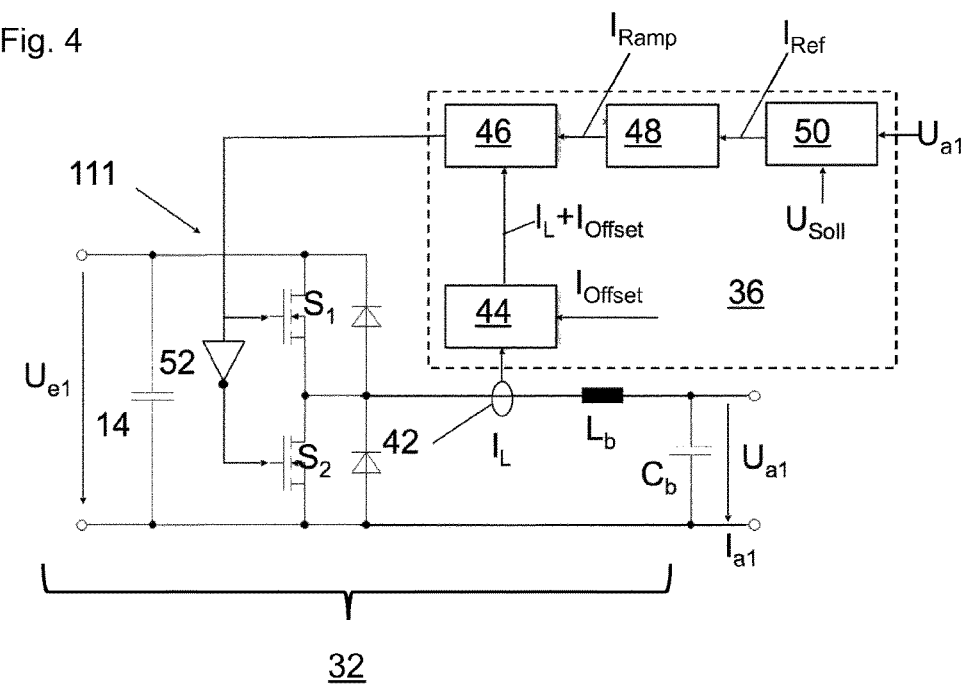
FIG. 4 illustrates (i) a schematic circuit diagram of the buck converter of the DC/DC converter assembly in accordance with the embodiment of the present invention and (ii) a block diagram of a peak current controller associated with the buck converter of the DC/DC converter assembly in accordance with the embodiment of the present invention.

For simplicity, functionally comparable components in FIGS. 1 and 2 have the same reference numerals. Reference numerals of other components of FIG. 1 refer to the schematic representations of DC/DC converter 112, 111 in FIGS. 3 and 4, respectively. Likewise, some circuit parts in FIGS. 3 and 4 are designated by reference numerals of FIGS. 1 and 2.

As shown in FIG. 1, first DC/DC converter 111 is connected to the HV voltage level. First DC/DC converter 111 converts the HV DC voltage $U_{HV}$ from a HV battery (such as 1500 V) into an intermediate DC voltage $U_{ZK}$ (such as about 400 V). Since the value of the HV DC voltage $U_{HV}$ can vary, first DC/DC converter 111 has a variable transmission ratio, which can be achieved by a PWM control of its controllable switches $S_1$, $S_2$ with a respectively predetermined duty cycle or sampling rate. Particularly advantageously, first DC/DC converter 111 is a buck converter (or buck/boost converter), particularly with SiC MOSFETs as its switches $S_1$, $S_2$.

As further shown in FIG. 1, second DC/DC converter 112 is connected between first DC/DC converter 111 and the LV voltage level. Second DC/DC converter 112 includes a DC/AC converter 16, a transformer 22, and a DC/AC converter 24, which are serially arranged. Second DC/DC converter 112 functions to convert the intermediate DC voltage $U_{ZK}$ to a LV DC voltage $U_{LV}$. To achieve a high dynamic, it is advantageous to provide DC/DC converter 112 as a LLC converter, since this type of converter can be used bidirectionally without changing the clocking. Alternatively, however, other types of DC/DC converters can be used.

Advantages of the serial arrangement of DC/DC converters 111 and 112 are that the current kept small in almost the entire DC/DC converter assembly 100 and only on the LV level is the current increased by the transmission by transformer 22 and AC/DC converter 24. Small currents cause only small thermal losses, which achieves a high efficiency.

By the controller which does not have to identify the load changes with energy direction change, the output capacitor $C_a$ can be made very small.

In FIGS. 3 and 4, the structure of the buck converter of first DC/DC converter 111 and the series resonant converter of second DC/DC converter 112 are respectively shown schematically.

The series-resonant converter of second DC/DC converter 112 shown in FIG. 3 includes controllable switches $S_3$ to $S_{10}$ of two complete switching bridges. The switching bridges are coupled to one another via a transformer T. As energy storage, a capacitor $C_r$ and an inductance $L_r$ are provided. By a fixed predetermined timing of the switches $S_3$ to $S_{10}$, a ratio between the input voltage $U_{e2}$ (i.e., the intermediate DC voltage $U_{ZK}$) and the output voltage $U_{a2}$ (i.e., the LV DC voltage $U_{LV}$) is fixed. As such, a fixed ratio $ü=U_{a2}/U_{e2}$ is realized. The fixed ratio is significantly smaller than one in DC/DC converter assembly 100.

FIG. 4 shows the construction principle of the bidirectional buck converter of first DC/DC converter 111. The switch $S_1$, which is usually designed as a transistor, is regularly switched on and off by driver 36. Typically, several hundred to several million switching cycles per second are performed. As a result, electrical energy supplied from the voltage source (e.g., HV battery) having an input voltage $U_{e1}$ (i.e., the HV voltage $U_{HV}$) is converted into an output voltage $U_{a1}$ (i.e., the intermediate DC voltage $U_{ZK}$) for connection to a load (i.e., second DC/DC converter 112).

The energy storage coil and capacitor $C_b$ allow the supply of the load in the phases in which the switch $S_1$ is open. The inductance $L_b$ keeps the higher input voltage $U_{e1}$ away from the load. The magnitude of the output voltage $U_{a1}$ can be specified by controlling the switch-on and switch-off times of the switch $S_1$.

This control is usually performed by driver 36 with a regulator to maintain the output voltage $U_{a1}$ or the output current $I_{a1}$ at a desired value. By means of the second switch $S_2$, by reversing the input and output of the buck converter, the buck converter can be operated in the opposite direction as a boost converter (i.e., step-up converter) instead of as a buck converter (i.e., step-down converter).

For DC/DC converter assembly 100 to achieve the most dynamic behavior possible in both directions of energy flow and especially during a change in the direction of energy flow, first DC/DC converter 111 is associated with a peak current controller (PCC). The peak current controller is implemented in driver 36.

Figure 5:
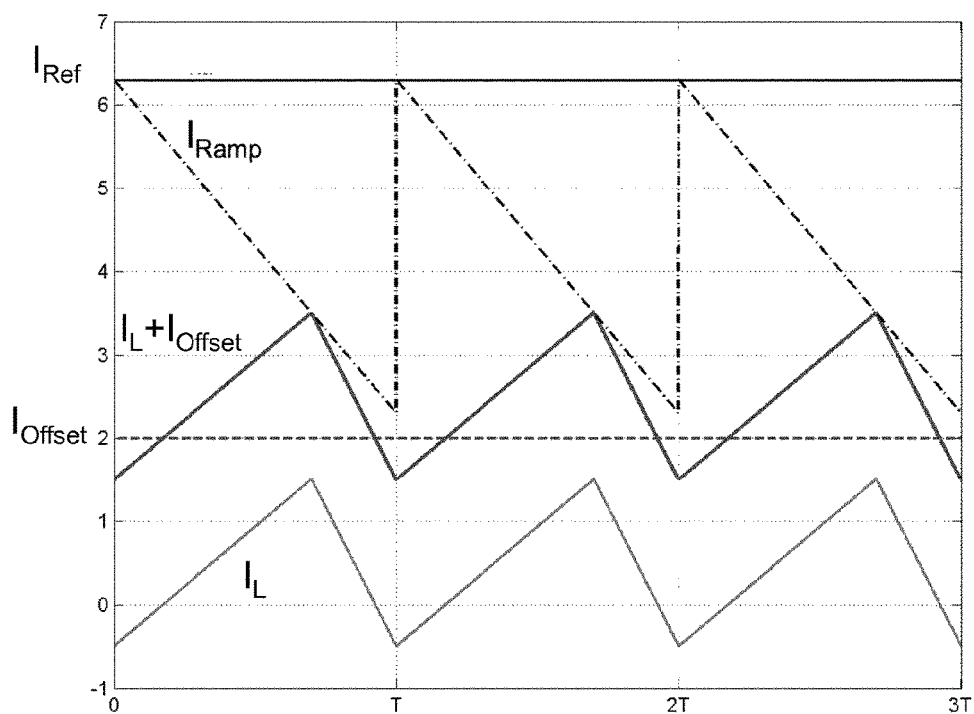
FIG. 5 illustrates current waveforms associated with the buck converter and the peak current controller of the DC/DC converter assembly in accordance with the embodiment of the present invention.

To use peak current control bidirectionally, the peak current controller adds an offset value $I_{Offset}$ to the coil current $I_L$ detected at the inductance $L_b$ so that the sign of the modified coil current $I_L+I_{Offset}$ does not change over the course. For example, the value of the modified coil current $I_L+I_{Offset}$ stays positive as shown in FIG. 5. As a result, a highly dynamic energy flow change is possible, which proceeds without further measurement or query of a condition.

Current waveforms resulting from the peak current control are shown in FIG. 5. In first DC/DC converter 111, as shown in FIG. 4, a current sensor 42 detects the coil current $I_L$ through the inductor $L_b$. An adder 44 of the peak current controller adds a pre-calculated constant offset value (i.e., $I_{Offset}$) to this detected coil current $I_L$ and thus forms the modified coil current value $I_L+I_{Offset}$.

By comparing the modified coil current $I_L+I_{Offset}$ with a higher-level control reference current value $I_{Ref}$, the duty cycle of first DC/DC converter 111 is regulated and thus the output current $I_{a1}$ is adjusted dynamically. For this purpose, the peak current controller includes a current regulator 50. Current regulator 50 outputs a reference current value $I_{Ref}$ based on the output voltage $U_{a1}$ of first DC/DC converter 111 (i.e., the intermediate DC voltage $U_{ZK}$) and a voltage command value $U_{Soll}$ corresponding to LV DC voltage $U_{LV}$.

A ramp generator 48 of the peak current controller generates, starting from reference current value $I_{Ref}$, a periodically sloping sawtooth-shaped ramp current $I_{Ramp}$. The profile of ramp current $I_{Ramp}$ is outlined in FIG. 5 by a dot-dash line.

A comparator 46 of the peak current controller compares the falling ramp current $I_{Ramp}$ with the rising modified coil current value $I_L+I_{offset}$. When the value of the ramp current $I_{Ramp}$ falls below the value of the modified coil current $I_L+I_{offset}$, the sign of the output signal of comparator 46 changes. The output signal of comparator 46 is applied to the gate of transistor $S_1$ and to the gate of second transistor $S_2$ via inverter 52. Transistors $S_1$, $S_2$ are thereby both reversed, so that coil current $I_L$ now falls until the ramp current signal $I_{Ramp}$ rises again. The components belonging to peak current controller of driver 36 can be realized both by hardware and by software components.

LIST OF REFERENCE NUMERALS 10, 100 DC/DC converter assembly
11, 111 DC/DC converter (Buck converter)
12, 112 DC/DC converter (Series resonant converter)
13 High-voltage terminals
14 High-voltage capacity
16 High-voltage DC/AC converter
18 High-voltage converter switch
20 Driver
22 Transformer
24 Low-voltage AC/DC converter
26 DC link connections
28 DC link capacity
30 Intermediate circuit
32 Buck converter
34 Low-voltage converter switch
36 Driver (Bidirectional peak current controller)
38 Output capacity
40 Low-voltage terminals
42 Current sensor
44 Adder
46 Comparator
48 Ramp generator
50 Current regulator
52 Inverter
(16, 22, 24) Series resonant converter
$C_a$ Output capacitor
$C_b$, $C_r$ Capacitors (Cb and DC link capacitance)
$I_L$ Inductor coil current
$I_{a1}$, $I_{a2}$ Output currents
$I_{e1}$, $I_{e2}$ Input currents
$I_{Offset}$ Offset value
$I_L+I_{Offset}$ Modified Coil Current (value)
$i_{Ramp}$ Ramp Current (signal)
$i_{Ref}$ Reference Current Value
$L_b$, $L_r$ Inductors
$U_{HV}$ High-voltage DC voltage
$U_{LV}$ Low-voltage DC voltage
$U_{Soll}$ Voltage setpoint
$U_{ZK}$ DC link voltage
$U_{a1}$, $U_{a2}$ Output voltages
$U_{e1}$, $U_{e2}$ Input voltages PWM Pulse-width-modulated signal
$S_1$-$S_{10}$ Switches (transistors)
T Transformer While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bidirectional DC/DC converter assembly for an electric vehicle having a high-voltage (HV) level and a low-voltage (LV) level, the bidirectional DC/DC converter assembly comprising:
 a first DC/DC converter having a first port and a second port, the first DC/DC converter connected to the HV level by the first port being connected to the HV level;
 a second DC/DC converter having a third port and a fourth port, the second DC/DC converter connected to the first DC/DC converter by the third port being connected to the second port, the second DC/DC converter connected to the LV level by the fourth port being connected to the LV level, wherein the second DC/DC converter is a series resonant switching converter formed by a DC/AC converter, a transformer, and an AC/DC converter;
 wherein when energy is to flow in a first direction from the HV level to the LV level the first DC/DC converter is operable as a buck converter to convert a high DC voltage inputted to the first port into an intermediate DC voltage that is outputted at the second port;
 wherein when energy is to flow in a second direction from the LV level to the HV level the first DC/DC converter is operable as a boost converter to convert at intermediate DC voltage inputted to the second port into a high DC voltage that is outputted at the first port; and
 a peak current controller associated with the first DC/DC converter, the peak current controller including a current sensor for measuring an inductor current of an inductor of the first DC/DC converter,
 wherein, when the inductor current is a bidirectional inductor current having a polarity that changes between positive and negative during a change in the flow of energy between the first and second directions, the peak current controller generates a modified current variable that is a summation of the bidirectional inductor current and an offset value, the offset value being such that the modified current variable has a constant polarity,
 wherein the peak current controller uses the modified current variable as a set point in controlling power switches of the first DC/DC converter during a change in operation of the first DC/DC converter between the buck converter and the boost converter in correspondence with the change in the flow of energy between the first and second directions.

2. The bidirectional DC/DC converter assembly of claim 1 wherein:
 the power switches of the first DC/DC converter and power switches of the second DC/DC converter are silicon carbide or gallium nitride semiconductor power switches.

* * * * *